May 19, 1970　　F. T. CROSS ET AL　　3,512,505

FISH FEEDER

Filed March 26, 1968

INVENTORS
FRANK T. CROSS
WILLIAM B. HARVEY
BY ROBERT J. PATCH
ATTORNEY

United States Patent Office 3,512,505
Patented May 19, 1970

3,512,505
FISH FEEDER
Frank T. Cross, Alexandria, Va. (5717 56th Place, Apt. 102, Riverdale, Md. 20840), and Wlilliam B. Harvey, Greenbelt, Md. (% Russell-William Ltd., 112G Frederick Ave., Rockville, Md. 20850)
Filed Mar. 26, 1968, Ser. No. 716,041
Int. Cl. A01k 61/02
U.S. Cl. 119—51     10 Claims

ABSTRACT OF THE DISCLOSURE

A fish feeder comprises a block of plastic foam having a vertical collimating chute therein that opens through the lower surface of the block. The lower end of the chute is restricted so as to support in the chute an upright file of charges of fish food, for example in gelatin capsules. When the block is floated on the water, only the lowermost charge is exposed to water and disintegrates to release a charge of fish food. The disintegration of the charges is so slow that a charge is released only once every several hours. The feeders can be rechargeable or can be of the type that is discarded after a fixed quantity of fish food is dispensed.

---

The present invention relates to fish feeders, more particularly of the type designed automatically to dispense fish food at a timed rate.

Automatic fish feeders as known heretofore have suffered from the great disadvantages that they had to be power driven and were quite bulky and complicated and expensive. On the other hand, such fish feeders nevertheless found a market, because it is highly desirable that some means be provided for automatically feeding fish such as tropical fish in a home aquarium, without the need for constant supervision. For example, if the aquarium is to be left unattended for several days, it has heretofore been necessary either to use such an automatic fish feeder as was previously known, or to arrange for someone to come into the home and feed the fish. Both expedients were equally expensive or inconvenient or otherwise unsatisfactory.

Accordingly, is is an object of the present invention to provide a fish feeder which has no moving parts and which is adapted automatically to dispense timed and measured quantities of fish food to an aquarium over a period of at least several days, with no supervision.

Another object of the present invention is the provision of a fish feeder which dispenses fish food batchwise, in predetermined quantities at predetermined time intervals.

It is also an object of the present invention to provide such a fish feeder, which will be very simple and easy to manufacture and assemble and charge and recharge with fish food, and which will be rugged and durable in use.

Other objects and advantages of the present invention will become apparent from a consideration of the following description, taken in connection with the accompanying drawing, in which.

Figure 1:
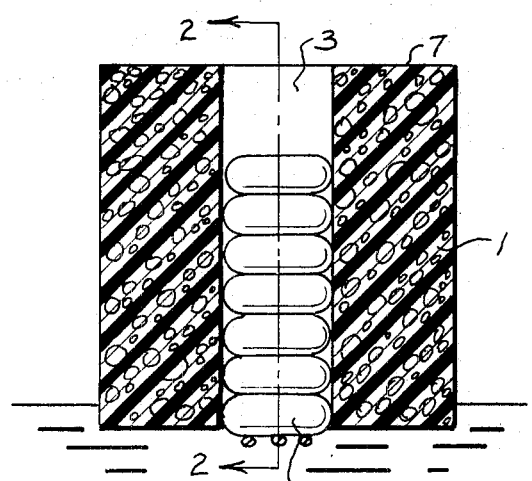
FIG. 1 is a side cross-sectional view of a fish feeder according to the present invention, showing the feeder in the position in which it floats on the water of an aquarium.
Figure 2:
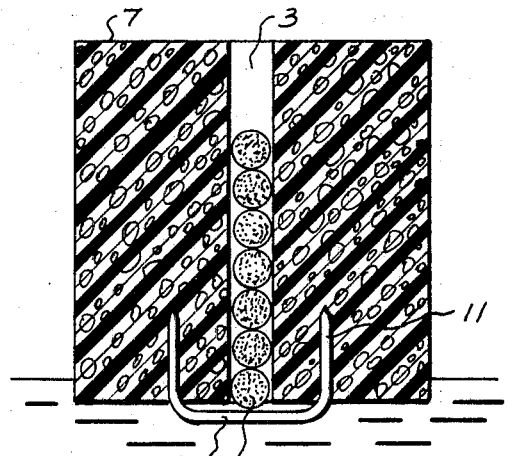
FIG. 2 is a cross-sectional view taken on the line 2—2 of FIG. 1.
Figure 3:
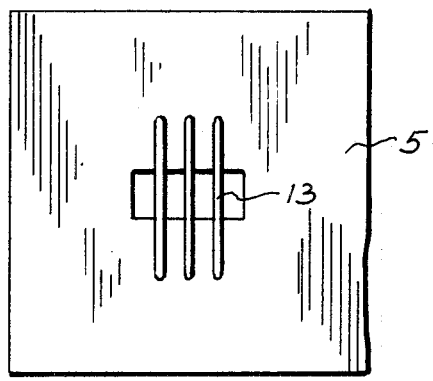
FIG. 3 is a bottom plan view of the fish feeder of FIG. 1.
Figure 4:
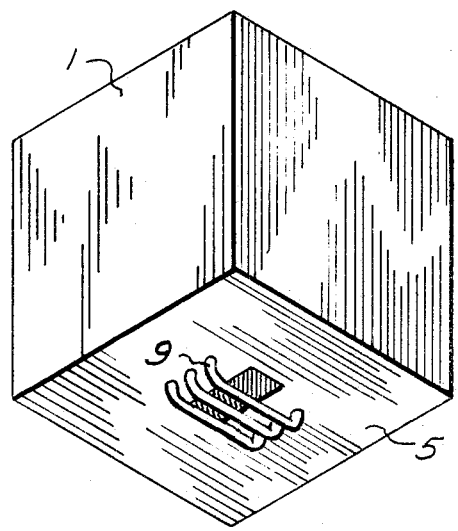
FIG. 4 is a prespective view from below, of the fish feeder of FIGS. 1–3.

Referring now to the drawing in greater detail, there is shown a fish feeder according to the present invention, comprising a buoyant body 1 of plastic foam such as polystyrene foam or the like, or other highly buoyant material such as cork. Body 1 can also be a hollow body of polyethylene or other waterproof material. An elongated upright collimating chute 3 extends vertically through body 1 and opens at its lower end through the lower face 5 of body 1. In the embodiment of FIGS.1-4, chute 3 also opens through the upper face 7 of body 1, thereby to provide a rechargeable or reusable fish feeder. The cross-sectional configuration of chute 3 is substantially constant throughout its length.

The lower end of chute 3 is restricted by a plurality of U-shaped staples 9 that have their ends 11 embedded in the material of body 1 on either side of chute 3, and that have central portions 13 that extend across the lower end of chute 3 like bars. In the illustrated embodiment, central portions 13 are spaced a small distance below lower face 5; however, it will be understood that in practice, the central portions 13 may lie flat against lower face 5, or that central portions 13 may have upwardly extending portions that actually project a short distance up into the lower end of chute 3.

The purpose of staples 9 is to provide means to restrict the open lower end of chute 3, thereby to retain and support an upright file of charges of fish food in chute 3. In the illustrated embodiment, these charges of fish food are shown as capsules 15 of which contains a quantity of particulate fish food 17 of the usual composition, which is well known per se and accordingly need not be further described herein. In the illustrated embodiment, capsules 15 are elongated; and as a result, chute 3 is shown as being rectangular in cross section, thereby to have cross-sectional dimensions only slightly greater than the length and width of capsules 15, so that capsules 15 are maintained in a single vertical file in which the capsules 15 rest on each other by gravity, the lowermost capsule 15 being supported by central portions 13 of staples 9 and in turn supporting the stack or file of capsules 15 above it.

It will of course be understood that staples 9 may be present in any number so long as they do not completely close the lower end of chute 3. Also, any other foraminous or perforate means can be provided for thus partially closing the lower end of chute 3, such as screening or other devices (not shown). Also, it will be understood that, although only one chute 3 has been shown, there may be a plurality of chutes 3 in general parallelism to each other and extending through a single body 1.

However, the area of the lower face 5 of body 1 should be at least five times greater than the cross-sectional area of chute 3 or the sum of the cross-sectional areas of all the chutes 3 if there are plural chutes 3, more preferably at least ten times greater than the total chute cross-sectional area.

It will be understood that the embodiment of FIGS. 1–4 is a reusable and reloadable embodiment of the invention. In the embodiment of FIGS. 1–4, capsules are fed into the upper end of chute 3 and come to rest on the central portions 13 of staples 9, or come to rest on capsules 15 already in the chute. The chute may be filled up to its top, or only part way to its top, whereupon the fish feeder is floated on the water of the aquarium in the position shown in FIGS. 1 and 2. The buoyancy of body 1 is so great that the total weight of body 1 and capsules 15 and staples 9 is enough to sink body 1 into the water a distance such that only the lowermost capsule 15 in chute 3 is contacted by water. The level to which body 1 sinks relative to the position of the lowermost capsule 15 can be adjusted by pulling the staples 9 out or pushing them in, or by providing a somewhat different form of retaining means at the bottom of the chute, as explained above.

Only the lowermost capsule 15 is thus exposed to water, and the capsule slowly disintegrates. A preferred form of capsule that will slowly disintegrate is a pure animal gelatin capsule of conventional construction as used for pharmaceuticals to be taken internally, and which is procurable commercially at a wide variety of sales outlets. When ingested by humans, the gelatin of such a capsule hydrolyzes relatively rapidly under the acidic conditions of the human stomach; but when exposed to the neutral water of a household aquarium at room temperature, at a pH of substantially 7, the gelatin hydrolyzes only very slowly, and will not disintegrate for a number of hours, for example, six hours.

Upon disintegration, a charge of fish food is released virtually all at once into the quarium, in sufficient quantity that all the fish have a fair chance to feed. This contrasts to a continuous dispensing of fish food, during which only the more aggressive fish eat because there is only enough fish food present in the aquarium at one time to feed the aggressive fish, and the passive fish tend to starve.

Of course it is not necessary that the fish food be encapsulated. It can be briquetted, with a hydrolyzable binder, such as animal gelatin which will retard its disintegration and tend to make the dispensing of fish food into the aquarium batch-wise rather than continuous. Alternatively, in a less preferred form of the invention, the fish food can be supplied in a form which disintegrates almost continuously; but this form of the invention is less preferred because the aggressive fish tend to overeat, as explained above.

It is also within the contemplation of the invention that it be possible to expose more than just the lowermost charge of fish food to the water. For example, if it is desired to feed the fish twice the quantity provided by the disintegration of a single capsule, it is possible so to adjust the staples 9 or other restricting means that the lowermost two or even the lowermost three capsules are immersed at the same time.

In order to maintain the water level at a desired position relative to the capsule or other charge of fish food, it ordinarily suffices to provide that the water level rise no higher than the top of the lowermost capsule. Nonhydrolyzed gelatin being relatively hydrophobic, there is little tendency to form a concave meniscus of the type that would prematurely wet the next higher capsule.

When thus regulating the water level, it should be borne in mind that the water level will be highest on the feeder when the feeder is fully charged with fish food, and lowest when only one charge remains. Therefore, the difference in water level between fully loaded and virtually empty conditions of the fish feeder should amount to less than the diameter of an individual solid charge of fish food, for example, an individual capsule 15. In order to reduce the variation in water level, the area of lower face 5 can be broadened. It is for this reason that it is desirable to maintain the area of lower face 5 such a number of times greater than the cross-sectional area of chute 3, as specified above.

Figure 5:
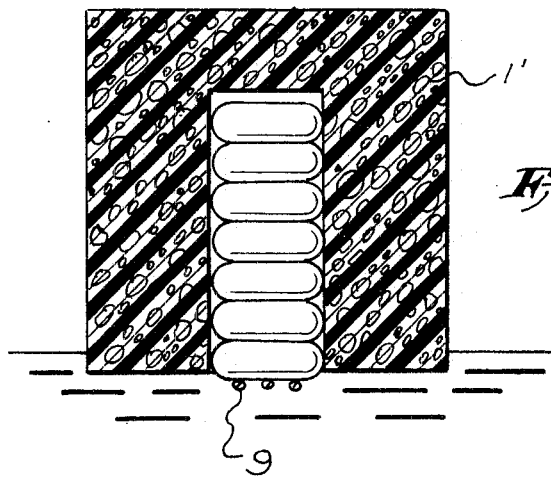
FIG. 5 is a view similar to FIG. 1 but showing a modified form of fish feeder according to the present invention.

A modified form of the invention is shown in FIG. 5, in which the tope of chute 3 is closed by the material of body 1. The embodiment of FIG. 5 is thus contemplated for use once, after which it can be discarded.

It is also preferred that the staples 9 or other restricting means at the lower end of chute 3 be of metal, preferably stainless steel or other corrosion-resistant metal. There is no advantage in making these restricting means of a lightweight metal, because the weight of the restricting means tends to stabilize the feeder in the upright position. Thus, the heavier the restricting means, the lower will be the center of gravity of the fish feeder and the greater will be its stability in the water. On the other hand, the weight of the restricting means should not be so great as undesirably to lower the fish feeder in the water.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. For example, body 1 could have any of a variety of other shapes and sizes. These and other modifications and variations are considered to be within the purview and scope of the present invention.

Having described our invention, we claim:

1. A fish feeder comprising a buoyant body having an elongated upright collimating chute therein that opens through at least the lower face of said body, and means carried by said body adjacent the lower end of the chute to restrict the open lower end of the chute to retain and support solid charges of fish food in an upright file in the chute but to expose the lowermost charge of fish food to water when said body floats on water.

2. A fish feeder as claimed in claim 1, and a plurality of solid charges of fish food in an upright file in the chute.

3. A fish feeder as claimed in claim 2, the chute being closed at its upper end.

4. A fish feeder as claimed in claim 1, the chute being open at its upper end.

5. A fish feeder as claimed in claim 2, the weight and buoyancy of the fish feeder and fish food and the location of said restricting means being so related that water rises in the chute no higher than the said lowermost charge when said body floats on water.

6. A fish feeder as claimed in claim 1, said chute being of substantially constant cross-sectional area throughout its vertical length.

7. A fish feeder as claimed in claim 1, the area of said lower face of said body being at least five times greater than the cross-sectional area of the chute.

8. A fish feeder as claimed in claim 1, the area of said lower face of said body being at least ten times greater than the cross-sectional area of the chute.

9. A fish feeder as claimed in claim 1, said restricting means comprising at least one U-shaped member that bridges the lower end of the chute and that has legs embedded in said body on opposite sides of the chute.

10. A fish feeder as claimed in claim 1, said body comprising a body of plastic foam.

References Cited

UNITED STATES PATENTS

| | | | |
|---|---|---|---|
| 2,711,714 | 6/1955 | Timeus | 119—5 |
| 2,961,994 | 11/1960 | Kopietz | 119—51 |
| 2,984,208 | 5/1961 | Kopietz | 119—51 |

HUGH R. CHAMBLEE, Primary Examiner

U.S. Cl. X.R.

206—.5